UNITED STATES PATENT OFFICE.

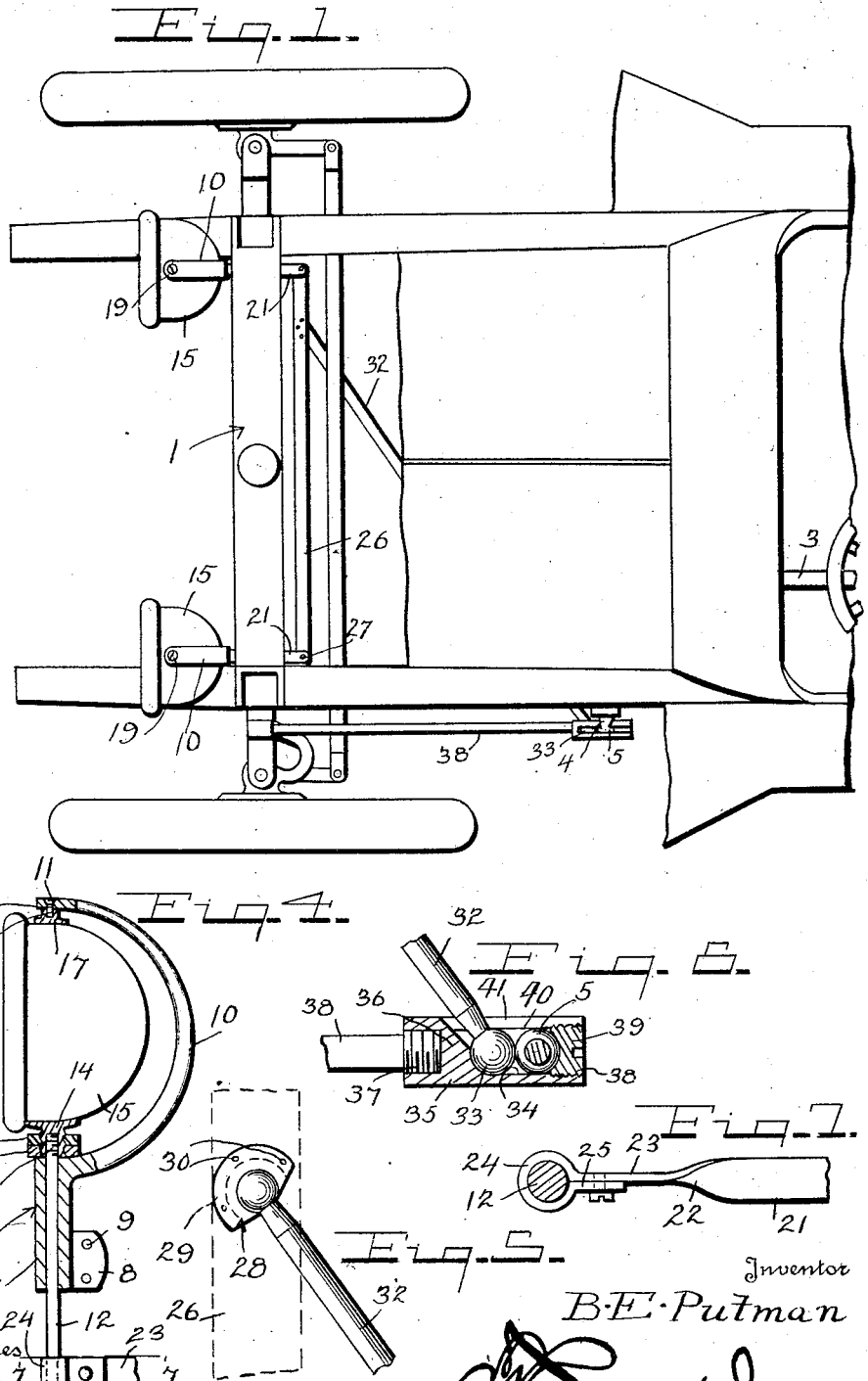

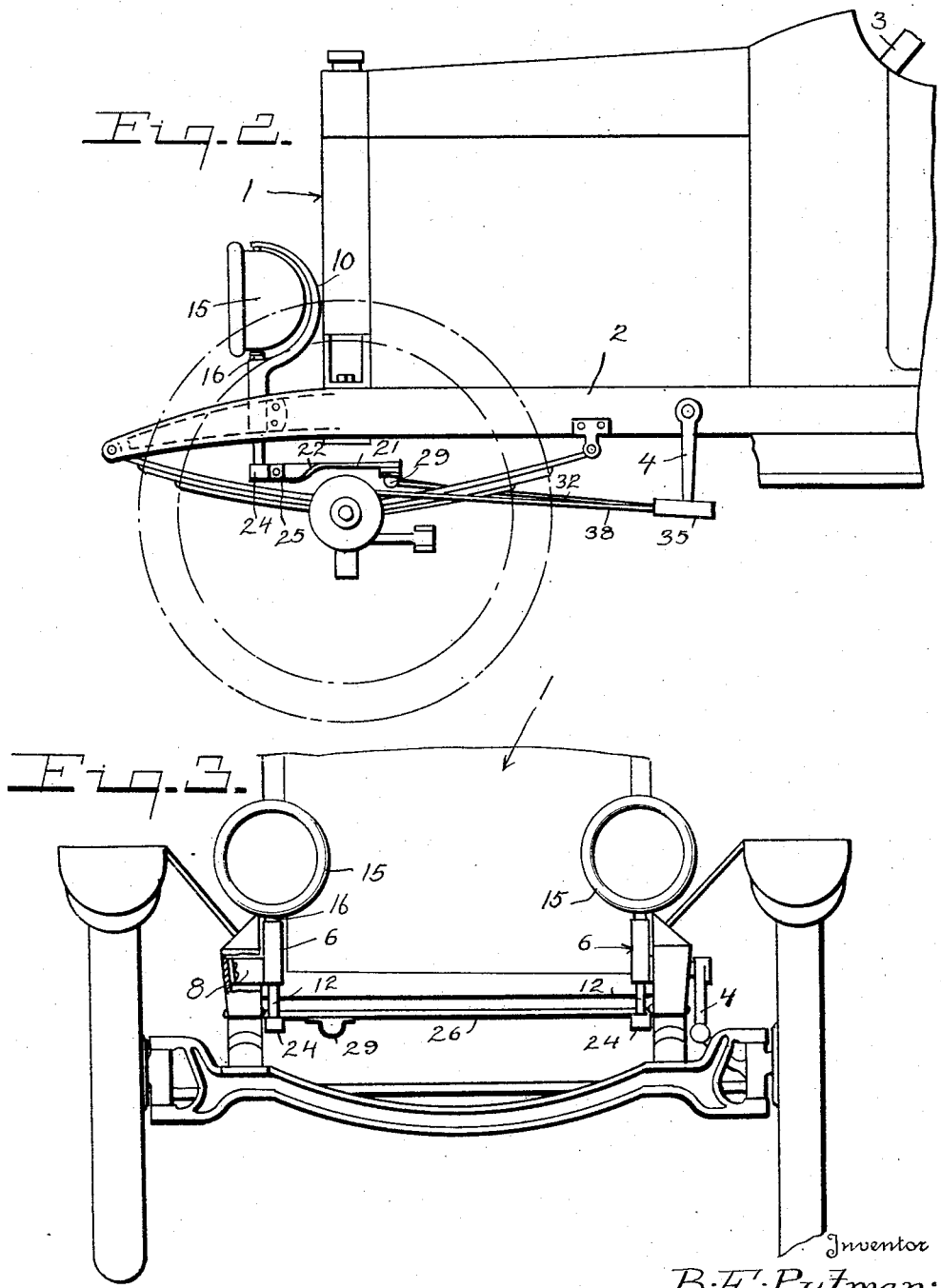

BYRON E. PUTMAN, OF COLONY, KANSAS.

DIRIGIBLE HEADLIGHT.

1,186,129.   Specification of Letters Patent.   Patented June 6, 1916.

Application filed November 28, 1914. Serial No. 874,453.

*To all whom it may concern:*

Be it known that I, BYRON E. PUTMAN, a citizen of the United States, residing at Colony, in the county of Anderson and State of Kansas, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in dirigible headlights, and has for its principal object to provide a device which will turn upon moving the steering wheel of the vehicle and thus illuminate the roadway at all times.

Another object of the invention is to provide a device which may easily be adjusted to take up wear and prevent rattling of the lamps in the brackets.

A further object of the invention is to provide a device which is connected with the steering mechanism of the vehicle so that regardless of the direction which is to be taken, the lamps will be turned so that there need be no danger of collision.

With these and other objects in view, the invention consists in the novel combination and arrangement of parts which will be fully set forth in the following specification and accompanying drawings, in which, Figure 1 is a top plan view of a fragment of a vehicle showing a portion of the hood in section more clearly to illustrate the details of construction of the device, Fig. 2 is a side view in elevation of Fig. 1, Fig. 3 is a front view of Fig. 2, a portion of the hood being broken away, Fig. 4 is an enlarged side view in elevation of the lamp showing the bracket partially in section, Fig. 5 is an enlarged detail fragmentary view of the link showing the same connected to the lamp-controlling bar, Fig. 6 is a detail view of the connection between the link and the steering mechanism, and Fig. 7 is a horizontal sectional view taken on line 7—7 of Fig. 4.

Referring now to the drawings by characters of reference, the numeral 1 designates as an entirety the motor vehicle provided with the usual frame 2 and steering column 3. This steering column is connected in the ordinary manner to the steering arm 4, which terminates at its lower extremity in the enlarged spherical head 5.

Secured to the forward end of the frame is the bracket designated generally by the numeral 6 which comprises the sleeve 7 having formed thereon the wing 8, which wing is provided with the apertures 9, through which bolts or rivets extend to support the bracket on the frame. Formed integral at the upper extremity of the sleeve 7 is the arcuate extension 10, the upper end of which terminates at a point in vertical alinement with the forward side of the sleeve 7, and this extremity is provided with the countersunk, screw-receiving aperture 11, the use of which will appear as the description proceeds. Extending through the sleeve and rotatably mounted therein is the stem 12 which is provided at its upper terminal with the external screw threads 13, which threads are arranged to coöperate with suitable threads formed in the socket 14, which socket is riveted or otherwise secured to the lamp 15. The socket is preferably cylindrical in cross section and provided with a plurality of screw threads with which the nuts 16 are arranged to coöperate in adjusting the lamp to take up wear. Secured to the upper side of the lamp at a point diametrically opposite the socket 14 is the socket 17 which is provided with the internally screw threaded recess 18 in which the screw 19, which projects through the aperture 11, extends and forms a pivot for the lamp.

Secured to the lower end of the stem 12 is the arm designated generally by the numeral 20 which comprises a body 21 which is twisted near its forward end as at 22 to form the parallel vertical extension 23 which is looped as at 24 and bent back upon itself as at 25 so that it frictionally engages the stem 12 and causes the same to turn upon movement of the arm.

In order that the lamps will turn simultaneously, a connecting bar 26 is riveted or otherwise pivotally secured as at 27 to the arm 21, and this bar is provided intermediate its ends with the connection designated generally by the numeral 28, which comprises the flange 29 which is riveted or otherwise secured thereto as at 30 and is provided with the hollow spherical portion 31, which portion is designed to receive the spherical end of the rod 32, the opposite end of which terminates in the spherical body 33 as clearly shown in Fig. 6.

In order that the rod 32 may be moved simultaneously with the steering arm 4, both the cylindrical enlargements 5 and 33 are arranged within the bore 34 formed in the cylindrical socket 35. This socket is provided near one end with the closure 36 and this closure separates the bore 34 from the internal screw threaded bore 37 in which the end of the steering rod 38 is secured. The end of the bore 34 opposite the wall 36 is internally screw threaded as at 39 and provided with a plug 39' having formed therein the concavity 40. The cylindrical socket is provided with the longitudinal slot 41 through which the rod 32 projects as clearly shown in the drawings.

It will be apparent from the foregoing that in use when the car turns either right or left the rod 32 will be pushed or pulled according to the direction, and thereby move the bar 26 which will impart motion to the lamps by means of the arm 21 and thereby swing the lamps so that they throw their light in the direction of travel of the vehicle. Should the space in which the lamps rotate become greater through wear, it will be apparent that by adjusting the nuts 16 on the socket 14 that the wear may be taken up so as to avoid any rattle of the several parts. Should the hub or wall 36 in the socket 35 become worn the plug may be tightened against the enlargement 5 and thus take up the wear and prevent any rattling.

While in the foregoing there has been shown and described the preferred embodiment of this invention it is to be understood that such changes may be made in the combination and arrangement of parts as will fall within the spirit and scope of the invention as defined in the appended claims.

What is claimed is:

1. A dirigible headlight including a sleeve, a securing plate formed at one end of the sleeve, an arcuate extension formed at the other end of the sleeve, the free terminal of the arcuate extension being apertured and said aperture being in direct alinement with the bore of the sleeve, a stem rotatable within the sleeve, and means secured to the upper end of the stem to adjustably support the headlight, and means secured to the opposite side of the headlight to pivotally hold the same to the free end of the arcuate extension.

2. In a dirigible headlight, a sleeve, a shaft rotatable within the sleeve, means to rotate the shaft, an attaching plate carried by the sleeve, an arcuate extension at the upper terminal of the sleeve, said arcuate extension being provided with an aperture alining with the bore of the sleeve near its free end, a headlight arranged to be held within the arcuate extension, a socket secured to the headlight and coöperating with the aperture in the arcuate extension to rotatably support the headlight, a second socket secured to the opposite side of the headlight, said sleeve being designed to receive the upper end of the stem, and nuts threaded on the first mentioned socket and designed to take up wear thereon, due to the rotation of the lamp.

3. A dirigible headlight comprising sleeves, means for attaching said sleeves to the frame of an automobile, stems rotatably mounted in said sleeves, lamps secured to the upper ends of the stems, arms connected to the stems, a connecting bar secured to said arms, a rod pivotally connected at one end to said connecting bar, said rod provided with a spherical body on its other end, a steering rod having a spherical body at one end thereof, a member provided with an elongated slot to receive said spherical bodies, a plug carried by said member to secure the spherical bodies within the slot of said member.

In testimony whereof I affix my signature in presence of two witnesses.

BYRON E. PUTMAN.

Witnesses:
J. F. RISSEL,
C. E. WILSON.

Copies of this patent may be obtained for five cents each, by addressing the "Commissioner of Patents, Washington, D. C."